United States Patent [19]

Hatch et al.

[11] Patent Number: 5,471,217
[45] Date of Patent: Nov. 28, 1995

[54] METHOD AND APPARATUS FOR SMOOTHING CODE MEASUREMENTS IN A GLOBAL POSITIONING SYSTEM RECEIVER

[75] Inventors: Ronald R. Hatch, Wilmington; Jerry E. Knight, Long Beach, both of Calif.

[73] Assignee: Magnavox Electronic Systems Company, Fort Wayne, Ind.

[21] Appl. No.: 12,061

[22] Filed: Feb. 1, 1993

[51] Int. Cl.$^6$ .............................. H04B 7/185; G01S 5/02
[52] U.S. Cl. ............................................ 342/357; 375/200
[58] Field of Search ......................... 342/357; 455/12.1; 375/1

[56] References Cited

U.S. PATENT DOCUMENTS

| | | | |
|---|---|---|---|
| 4,578,678 | 3/1986 | Hurd | 342/357 |
| 4,963,889 | 10/1990 | Hatch | 342/357 |
| 5,148,179 | 9/1992 | Allison | 342/357 |

OTHER PUBLICATIONS

Ronald R. Hatch, in "The Synergism of GPS Code and Carrier Measurements," Proc. of the Third (1982) Intl. Geodetic Symposium on Satellite Doppler Positioning, DMA/NOS. pp. 1213–1232.

*Primary Examiner*—Theodore M. Blum
*Attorney, Agent, or Firm*—Noel Heal; Richard T. Seeger

[57] ABSTRACT

A technique for smoothing pseudorange code measurements made in a global positioning system (GPS) receiver, with carrier phase measurements, over an extended time interval but without distortion that usually results from a divergence between code-derived pseudorange measurements and carrier-derived measurements. The basic principle of the invention is to remove ionospheric effects and Doppler effects from the pseudorange code measurements prior to filtering over an extended time interval. Removal of ionospheric effects may be effected by applying corrections received from a reference receiver, or may be accomplished using measured or modeled ionospheric data available to the receiver. The invention is applicable to differential GPS position finding using remote receivers having only a single-frequency capability, but is also applicable to stand-alone GPS receivers of any type.

24 Claims, 5 Drawing Sheets

METHOD AND APPARATUS FOR SMOOTHING CODE MEASUREMENTS IN A GLOBAL POSITIONING SYSTEM RECEIVER

BACKGROUND OF THE INVENTION

This invention relates generally to techniques for improving accuracy in range measurements made in global positioning system (GPS) receivers and, more particularly, to a technique for improving the accuracy of range measurements derived from GPS codes, using related measurements derived from GPS carrier phase. For a better understanding of these concepts, the basic operation of a conventional GPS receiver is first described by way of background.

A GPS receiver makes use of multiple orbiting satellites to determine the position of the receiver in three-dimensions. Each satellite transmits radio-frequency (rf) signals on which are encoded a pseudo-random code of relatively long period. The satellite transmissions are controlled and accurately synchronized by ground stations, and the receiver can determine the range (straight-line distance) of each satellite from the timing of the received code, which is derived from the received rf signals. This calculated range to each satellite within view of the receiver is referred to as a pseudorange, because there is a time offset between a receiver clock and the timing of the satellite transmitters, and in general this time offset is not known. However, with at least four satellite signals, a receiver can solve for this time offset and the receiver position in three dimensions. Techniques for performing these calculations are now well known in GPS technology.

In order to calculate its position, a receiver must also have knowledge of the instantaneous positions of the satellites. This information is also transmitted to the receiver in modulated form with the rf signal from each satellite transmitter. Thus each satellite also transmits ephemeris data defining its orbit, as well as other data needed by the receiver, all in a standard format known to the receiver. It will be understood from this brief description that the key measurements made at the receiver are the pseudorange measurements for each satellite within view of the receiver. From the pseudorange measurements, the receiver calculates its position, and a necessary time correction.

The measurement of pseudoranges using GPS code techniques is subject to errors arising from several sources, the principal one of concern being multipath effects. Multipath errors result from the superposition of a reflected signal onto the original satellite transmission. The reflected signal may be from a geographical or architectural feature near the receiver. The effect of noise, principally multipath noise, on pseudorange measurements derived from GPS codes is to reduce the accuracy of the resultant position calculations made in the receiver. Therefore, much attention has been directed to techniques for improving the accuracy of the pseudorange measurements.

A measure of range may also be derived from the phase of the carrier signal as received, or actually as reconstructed, in the receiver. (The carrier has to be reconstructed because it is the nature of spread spectrum modulation, used to modulate the carrier in the satellite transmitters, that the carrier frequency is suppressed.) The phase of the reconstructed carrier signal, relative to a local clock in the receiver, is referred to as the "relative carrier phase." Because the wavelength of the carrier is much smaller than the wavelength of the pseudorandom code that modulates the carrier, the relative carrier phase provides a much more accurate measure of pseudorange, but one that is only potentially helpful because of the "whole-cycle ambiguity" of phase measurements. Although the receiver can measure relative phase to a small fraction of carrier wavelength, it cannot easily determine the number of whole carrier wavelengths between the receiver and the transmitter. Therefore, relative carrier phase by itself is not a useful measure of pseudorange.

A more useful phase measurement is referred to as "integrated carrier phase" or "integrated Doppler." From the time a satellite signal is first acquired as the satellite rises above the horizon, the relative carrier phase changes as a result of the Doppler effect. As the satellite moves toward the receiver and then recedes away from it, the perceived frequency of the carrier changes as a function of the relative velocity of the satellite. The integrated carrier phase is derived by integrating the time rate of change of the relative phase over a selected time interval. When the relative velocity of the satellite with respect to the receiver is zero, the rate of change of relative phase is zero. When the relative velocity is larger in a positive sense, as when the satellite is approaching the receiver, the rate of change of the relative phase is also larger. When the relative velocity is larger in the opposite sense, as when the satellite is receding, the rate of change of the relative phase is also larger in the opposite sense. Thus the rate of change of relative phase provides a measure of relative velocity, and the integral of relative phase over a time interval provides a measure of change of range over the same time period.

Fortunately, carrier phase measurements are not affected by multipath noise anywhere near as much as code measurements. This is largely a matter of their relative wavelengths. For some years it has been known that the fine accuracy and noise immunity of carrier phase measurements can be combined with the coarse accuracy of code measurements of pseudorange, to obtain virtually noise-free pseudorange code measurements. This process is usually referred to as "smoothing code measurements with carrier measurements," and was first described by one of the present inventors, Ronald R. Hatch, in "*The Synergism of GPS Code and Carrier Measurements*," Proc. of the Third (1982) Intl. Geodetic Symposium on Satellite Doppler Positioning," DMA/NOS. pp. 1213–32.

As described in the Hatch paper, the smoothing of code measurements with carrier measurements can be performed as a post-processing function, after code and carrier measurements have been accumulated for a time, or can be performed in real time. In the specific method described by Hatch, carrier measurements of range change are first mapped into delta-pseudorange values that take into account ionospheric effects. Then these values are subtracted from pseudorange code measurements made over the same time period. Since the pseudorange (code) measurements and the delta-pseudorange (carrier) measurements are affected to the same degree by the Doppler effect, this subtraction of accumulated Doppler from the pseudorange values should result in a relatively constant pseudorange signal, equivalent in value to the pseudorange at the start of the integration interval. This constant signal still contains noise, however, principally due to multipath effects. Next the relatively flat pseudorange signal is filtered to remove the noise, and then the delta-pseudorange values are added back in, to produce a smoothed set of pseudorange measurements.

The smoothing process described in the Hatch paper depends on having access to both of the two carrier signals provided by GPS satellites, at frequencies referred to as $L_1$ and $L_2$. Since ionospheric effects vary with frequency, they may be corrected for by using the carrier measurements obtained from the two satellite signals. For simpler, and much less costly, GPS receivers having only a single-frequency capability, use of the smoothing process enjoys more limited success because of the divergence of code and carrier pseudorange signals with the passage of time. The ionosphere affects code and carrier signals differently. As signals propagate through the ionosphere, they experience a delay proportional to the inverse of the square of the frequency. Code signals do indeed experience such a delay. Therefore, the code signals arrive late and cause the perceived pseudorange to be longer than its correct value. Carrier signals, on the other hand, experience an equal and opposite phase advance as a result of passage through the ionosphere, and the perceived carrier pseudorange is shorter than its correct value. Although this phenomenon is not intuitively obvious, it is a well understood and universally accepted principle of GPS technology.

Errors that influence pseudorange measurements can be considered as falling into three categories. The first category contains phenomena that affect code and carrier measurements in a similar manner. These can be eliminated by subtracting the carrier signals from the code signals, as is done in the smoothing process. The second category includes just multipath effects, which act principally on code signals, and negligibly on carrier signals. These are virtually eliminated by the filtering step of the smoothing process. This leaves only the third category: the ionospheric effect, which affects code and carrier signals in opposite senses. For a single-frequency receiver, the smoothing process can be carried out for only a limited time before the divergence of carrier and code measurements results in a large difference between the shape of the smoothed pseudorange code measurements and the unfiltered pseudorange code measurements. Typically, the smoothing process is used only for periods of ten to fifteen minutes, to minimize the effects of this divergence.

Accordingly, there is a need for an improved technique for smoothing GPS code measurements, to provide higher accuracy over longer periods of time. The need is especially evident in the context of differential GPS. The concept of differential GPS is based on the fact that errors experienced by a GPS receiver, which may be moving, correlate closely with similar errors experienced by another receiver, a reference receiver in a nearby location that has been accurately surveyed. Errors measured at the reference receiver are transmitted to other receivers in the vicinity, over a communication link unrelated to the GPS. These other receivers, referred to as remote receivers, can then generate very accurate differentially corrected location solutions.

In a conventional differential GPS configuration, the reference receiver, which knows its own position to a high degree of accuracy, computes the actual range of each satellite based on the receiver location and on orbital position data provided in the ephemeris data transmitted with the GPS signals. The reference receiver also obtains the pseudorange to each satellite from code measurements, and subtracts the computed pseudorange, to obtain a pseudorange error for each satellite. The pseudorange errors are transmitted to and received by the remote receiver, which applies these error values as corrections to its own pseudorange code measurements.

Smoothing of the code measurements with the carrier measurements is currently applied to differential GPS by smoothing for five to ten minutes in the reference receiver, to produce code corrections with reduced multipath noise, and in the remote receiver. A smoothed pseudorange error is transmitted to the remote receiver and applied to the smoothed pseudorange measurements. Smoothing for a longer interval results in greater divergence between the code and carrier measurements. Moreover, this arrangement works only so long as the smoothing intervals in the reference and remote receivers are concurrent in time. If there is loss of communication between the reference and remote receivers, each will restart its smoothing interval independently of the other, aggravating the divergence problem.

Ideally, what is needed is a technique for smoothing pseudorange code measurements over a longer period of time without concern about the effect of divergence between code and carrier measurements. Such a technique could be applied to stand-alone receivers or to differential GPS receivers. As will become apparent from the following summary, the present invention satisfies this need.

SUMMARY OF THE INVENTION

The present invention resides in a method, and corresponding apparatus, for smoothing GPS pseudorange code signals with carrier signals over a relatively long time period, to reduce multipath and other errors. Another aspect of the invention applies the same principle to differential GPS, to derive corrected range measurements at a remote GPS receiver, these corrected range measurements being largely independent of multipath effects.

Briefly, and in general terms, the method of the invention comprises the steps of obtaining pseudorange code measurements and integrated carrier phase measurements in a single-frequency GPS receiver; deriving from the pseudorange code measurements and the integrated carrier phase measurements a composite set of measurements that is substantially free of Doppler effects and ionospheric effects; filtering the composite set of measurements over an extended time interval to remove errors that affect pseudorange measurements more than integrated carrier phase measurements; and replacing Doppler effects in the filtered composite set of measurements, to obtain smoothed pseudorange code measurements. Since ionospheric effects are the principal cause of divergence between code-derived pseudoranges and carrier-derived measurements, filtering after the ionospheric effects have been removed can be performed over a long time interval without distortion of the results. Moreover, techniques are disclosed for removing the ionospheric effects in the context of a single-frequency receiver, either a remote receiver using differential GPS or a stand-alone receiver.

In the differential GPS context, the step of deriving a composite set of measurements includes receiving pseudorange code corrections from a reference receiver; applying the pseudorange code corrections to the pseudorange code measurements, to obtain corrected pseudorange code measurements virtually free of ionospheric errors; receiving carrier phase corrections from the reference receiver; applying the carrier phase corrections to the pseudorange code measurements, to obtain corrected carrier phase measurements virtually free of ionospheric errors; and subtracting the corrected carrier phase measurements from the corrected pseudorange code measurements, to obtain the composite set of measurements without ionospheric or Doppler effects.

In another context, as in a stand-alone receiver or a reference receiver of a differential system, the step of deriving a composite set of measurements includes subtracting the carrier phase measurements from the pseudorange code measurements, to obtain code offset measurements substantially free of Doppler effects; and subtracting ionospheric error values from the code offset measurements, to obtain the composite set of measurements substantially free of ionospheric and Doppler effects.

More specifically, in the stand-alone context, the step of subtracting ionospheric values includes applying a correction derived from independent ionospheric measurements. Alternatively, the step of subtracting ionospheric values includes applying a correction derived from ionospheric model data received with GPS signals.

In a specific embodiment of the invention using differential position determination, the method includes, in the reference receiver, the steps of obtaining pseudorange code measurements and integrated carrier phase measurements, subtracting the carrier phase measurements from the pseudorange code measurements to obtain code offset measurements, removing ionospheric effects from the code offset measurements, filtering the resulting code offset measurements to obtain smoothed code offset measurements, adding back the carrier phase measurements to obtain smoothed pseudorange code measurements, computing range measurements from the known position of the receiver and known orbital parameters of satellites from which signals are being received, and subtracting the computed range measurements from the smoothed pseudorange code measurements, to obtain range corrections. Then the method performs the step of transmitting from the reference receiver to the remote receiver the code offset measurements prior to smoothing, and at least one set of measurements pertaining to smoothed range corrections. In the remote receiver, the method includes the steps of obtaining pseudorange code measurements and integrated carrier phase measurements, subtracting the carrier phase measurements from the pseudorange code measurements to obtain code offset measurements, removing ionospheric effects by subtracting the code offset measurements received from the reference receiver, filtering the resulting code offset measurements to obtain smoothed code offset measurements, adding back the carrier phase measurements to obtain smoothed pseudorange code measurements, and then applying range corrections derived in part from the at least one set of measurements pertaining to smoothed range corrections, to derive corrected range measurements.

More specifically, the step of transmitting at least one set of measurements pertaining to smoothed range corrections includes transmitting smoothed code offset measurements and transmitting range corrections. In the remote receiver, the step of applying range corrections includes subtracting the smoothed code offset measurements received from the reference receiver from the range corrections transmitted from the reference receiver, subtracting the resulting range errors from estimated ranges computed in the remote receiver, and subtracting the results of the latter subtraction from the smoothed code offset measurements generated in the remote receiver, to obtain the corrected range measurements.

The invention may also be defined in equivalent apparatus terms. For example, the apparatus may be defined as comprising means for obtaining pseudorange code measurements and integrated carrier phase measurements in a single-frequency GPS receiver; means for deriving from the pseudorange code measurements and the integrated carrier phase measurements a composite set of measurements that is substantially free of Doppler effects and ionospheric effects; means for filtering the composite set of measurements over an extended time interval to remove errors that affect pseudorange measurements more than integrated carrier phase measurements; and means for replacing Doppler effects in the filtered composite set of measurements, to obtain smoothed pseudorange code measurements.

In terms of apparatus for differential position determination at a remote global positioning system (GPS) receiver, the invention may be defined as comprising a reference receiver, including means for obtaining pseudorange code measurements and integrated carrier phase measurements; means for transmitting to a remote receiver at least two sets of measurements selected from the pseudorange code measurements, the integrated carrier phase measurements, corrections to the pseudorange code measurements, corrections to the integrated carrier measurements, and the difference between the pseudorange code measurements and the integrated carrier phase measurements; and a remote receiver, including means for obtaining pseudorange code measurements and integrated carrier phase measurements, means for processing the locally obtained measurements using the measurements received from the reference receiver, to derive a set of measurements substantially free of ionospheric effects and Doppler effects, means for filtering this derived set of measurements to remove noise effects, and means for restoring the Doppler effect to provide a smoothed and corrected set of pseudorange code measurements. In one of the disclosed embodiments, the reference receiver further includes means for computing theoretical pseudorange values and theoretical carrier phase values using the reference receiver's known position and known information about satellite orbits, and means for computing corrections for the pseudorange code measurements and the carrier phase measurements. The means for transmitting to the remote receiver includes means for transmitting the corrections for the pseudorange code measurements and the carrier phase measurements. In the remote receiver, the means for processing the locally obtained measurements includes means for applying the corrections transmitted from the reference receiver, to obtain corrected pseudorange code measurements and corrected carrier phase measurements that are virtually free of ionospheric effects, and means for subtracting the corrected carrier phase measurements from the corrected pseudorange code measurements, to obtain the set of measurements for filtering.

It will be appreciated from the foregoing that the present invention represents a significant advance in the field of high precision GPS receivers. In particular the invention provides a new approach that permits smoothing of pseudorange code measurements with carrier phase measurements over a relatively long time interval without distortion that usually results from a divergence between code-derived and carrier-derived values. The invention is applicable to single-frequency receivers, and is particularly well suited for application to differential GPS position finding using a single-frequency remote receiver. Other aspects and advantages of the invention will become apparent from the following more detailed description, taken in conjunction with the accompanying drawings.

DESCRIPTION OF THE PREFERRED EMBODIMENTS

As explained at some length in the foregoing background section of this specification, the present invention is concerned with improvements in GPS receivers that use smoothing of code measurements with integrated carrier phase measurements. The smoothing process may be best explained with reference to FIG. 1, which shows a prior art process for smoothing pseudorange (code) measurements in a receiver capable of processing both $L_1$ and $L_2$ GPS signals.

Figure 1:
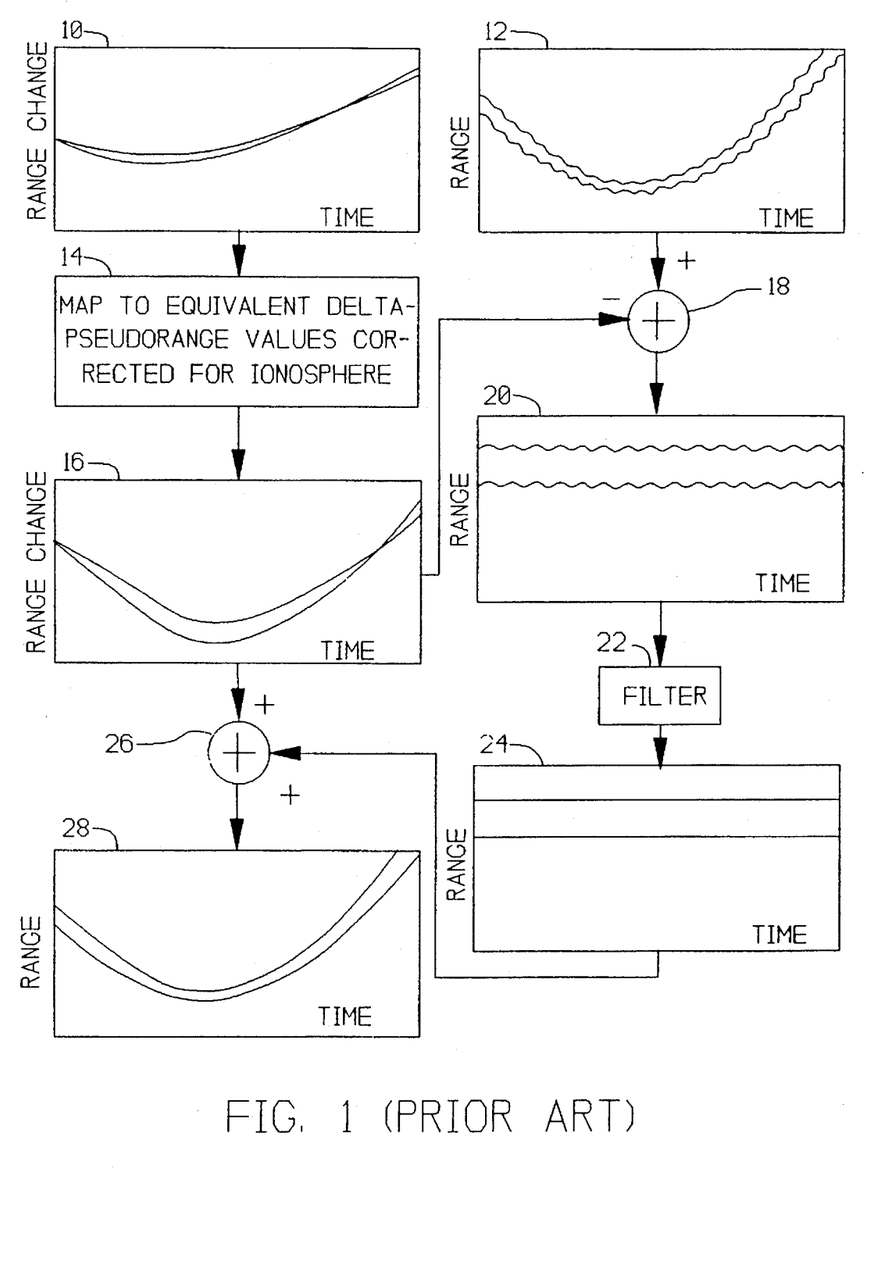
FIG. 1 is a diagram illustrating the prior art principle of smoothing GPS code measurements with integrated phase carrier measurements.

In the curves shown in block 10 in FIG. 1, the change in range (delta-range) measurements derived from an integration of the rate of change of relative carrier phase, are plotted with respect to time. The curves (one for each frequency of the carrier signals) have a characteristic shape indicative of an approaching, then receding satellite. The minimum values of delta-range correspond with the time when the satellite is closest to the receiver. The curves are relatively smooth because carrier measurements are only negligibly subject to multipath effects.

The curves in block 12 indicate pseudorange or code measurements taken over the same time interval as the carrier measurements. They have a similar characteristic shape, but are distorted by noise, which is principally due to multipath effects.

As indicated in block 14, the carrier measurements are mapped to corresponding delta-pseudorange values, shown in block 16, using a mapping transformation that is solely a function of the carrier frequencies $L_1$ and $L_2$. The mapping equations may be found in the Hatch paper cited earlier in this specification. The resulting mapped delta-pseudorange values shown at 16 represent highly accurate changes in pseudorange computed from carrier measurements to account for ionospheric effects.

Next, the delta-pseudorange values are subtracted from the corresponding pseudorange (code) measurements of the curves in block 12, as indicated by the subtraction circuit 18. Since both carrier and code measurements were subject to the same Doppler effects, the result of this subtraction should be to produce a relatively flat pair of curves, showing the pseudorange with the Doppler effect temporarily removed, as indicated in block 20. However, these curves still have the noise components of the curves in block 14. The next step is to smooth these curves by filtering over a selected time interval, as indicated at 22, producing the smoothed curves shown in block 24.

Finally, the delta-pseudorange values from block 18 are added back into the smoothed curves of block 24, as indicated by the adder circuit 26, and smoothed pseudorange measurements are obtained as indicated in block 28.

As explained in the foregoing background section, the smoothing process shown in FIG. 1 cannot be used for more than short periods of time in a singlefrequency GPS receiver, because of the divergence between code measurements and carrier measurements over a longer time. Moreover, the basic process of FIG. 1 as applied to differential GPS is most successful if smoothing is applied over identical time intervals in reference and remote receivers.

In accordance with the present invention, pseudorange code-derived values in any GPS receiver, whether single- or dual-frequency, can be smoothed with carrier measurements over a much longer time interval than was previously possible. Further, as will be explained below, the principle of the invention can also be usefully employed in differential GPS receivers.

Figure 2:
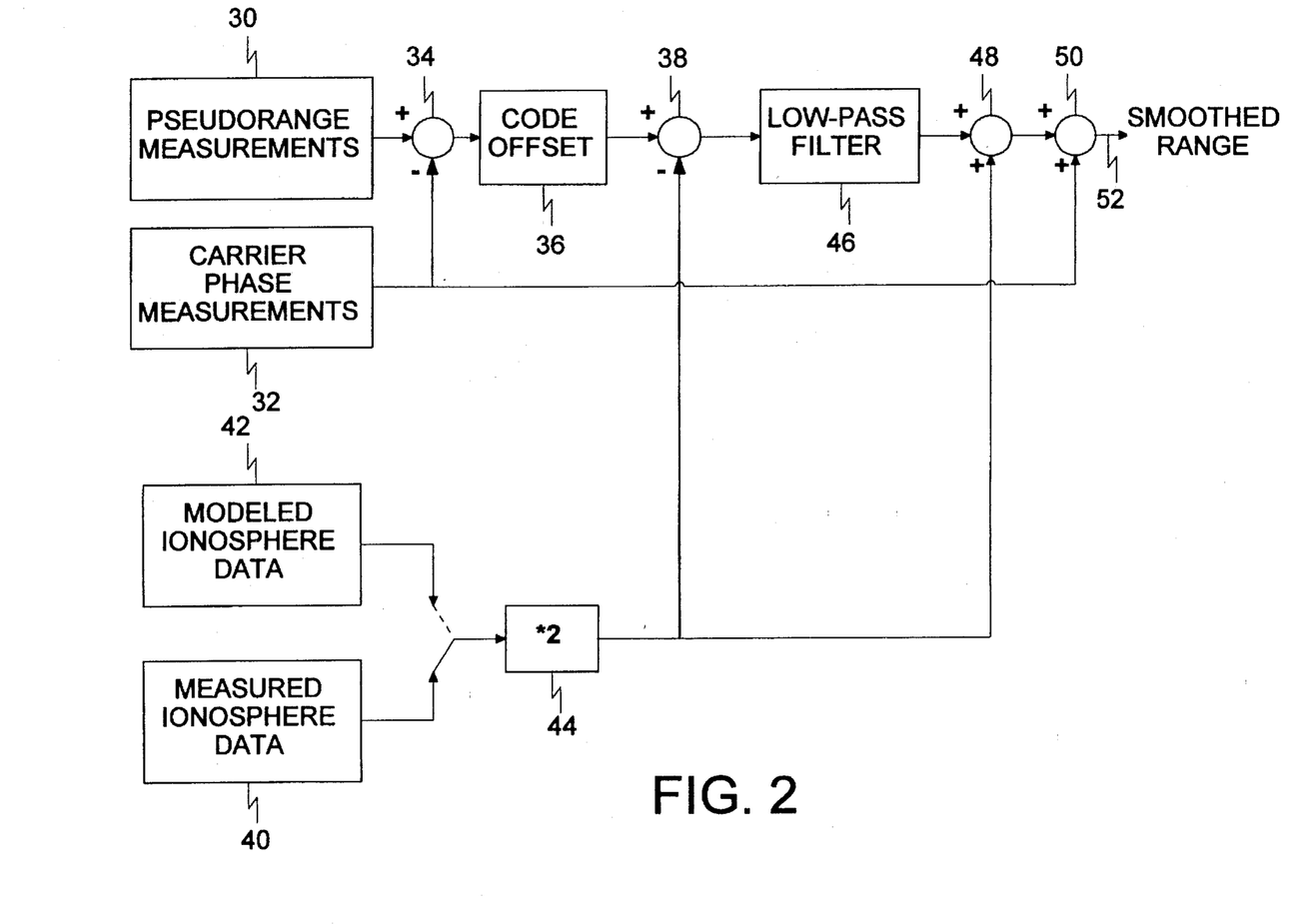
FIG. 2 is a block diagram illustrating one embodiment of the present invention, for smoothing code measurements with carrier measurements over a relatively long time interval.

FIG. 2 shows the smoothing technique of the invention as it might be employed in any GPS receiver, whether differential or independent. As in other systems, two forms of measurements are made: pseudorange or code measurements, as indicated at 30, and integrated carrier phase measurements, as indicated at 32. The units of measurement are consistent with each other and might, for example, be in meters, or in wavelengths of the carrier signal. In this description, it is also assumed that the integrated carrier phase measurement is initialized to be equal to the pseudorange value at the start of an integration interval, such as when the satellite signal is first acquired. Therefore, the integrated carrier phase contains a constant offset equal to the error in this initial value of the pseudorange measurement.

The carrier phase is subtracted from the pseudorange value, in circuit 34, to yield a code offset value, as indicated at 36. Initially, the code offset will be zero, but as time progresses, the code offset is a value indicative of the accumulated differences arising between a code tracking loop and a carrier tracking loop in the receiver. Next the code offset 36 is adjusted for ionospheric effects, by subtracting an ionospheric error term in a subtractor circuit 38. The source of the ionospheric corrections may be either a measured ionospheric correction generator, as indicated at 40, or a modeled ionospheric correction generator, as indicated at 42. The measured ionospheric data may be obtained as a result of having two carriers available in the receiver, or may be obtained from some source independent of the GPS. If measured ionospheric data is not available, data from a model of the ionosphere is used, as obtained from the satellites as part of the ephemeris data modulating the carrier.

The ionospheric error is then multiplied by two, as indicated at 44, before being subtracted from the code offset in circuit 38. The reason for the doubling of the correction value is related to the divergence between code and carrier measurements. As mentioned earlier, the ionosphere affects code and carrier signals in opposite directions. Since the code offset 36 is derived by subtracting carrier measurements from pseudorange (code) measurements, the ionospheric error is double its value in either one of the two types of measurements.

After the ionospheric correction in subtractor 38, the resulting corrected code offset is smoothed in a filter 46 to remove errors derived from multipath effects. Because the signal being smoothed is not subject to the divergence between code and carrier measurements (the ionospheric error having been removed), filtering may be carried out for an extended time interval without distorting the results.

After smoothing in the filter 46, the resulting smoothed code offset has the ionospheric error added back in, in adder circuit 48. Then the integrated carrier phase measurements 32 are added back in, in adder circuit 50, to yield smoothed pseudorange measurements on output line 52.

The basic embodiment of FIG. 2 provides for smoothing of pseudorange measurements with carrier measurements over a relatively long time interval without any ensuing distortion, because the smoothing is done on signals from which Doppler effects and ionospheric effects have first been removed, and are subsequently replaced.

Figure 3A:
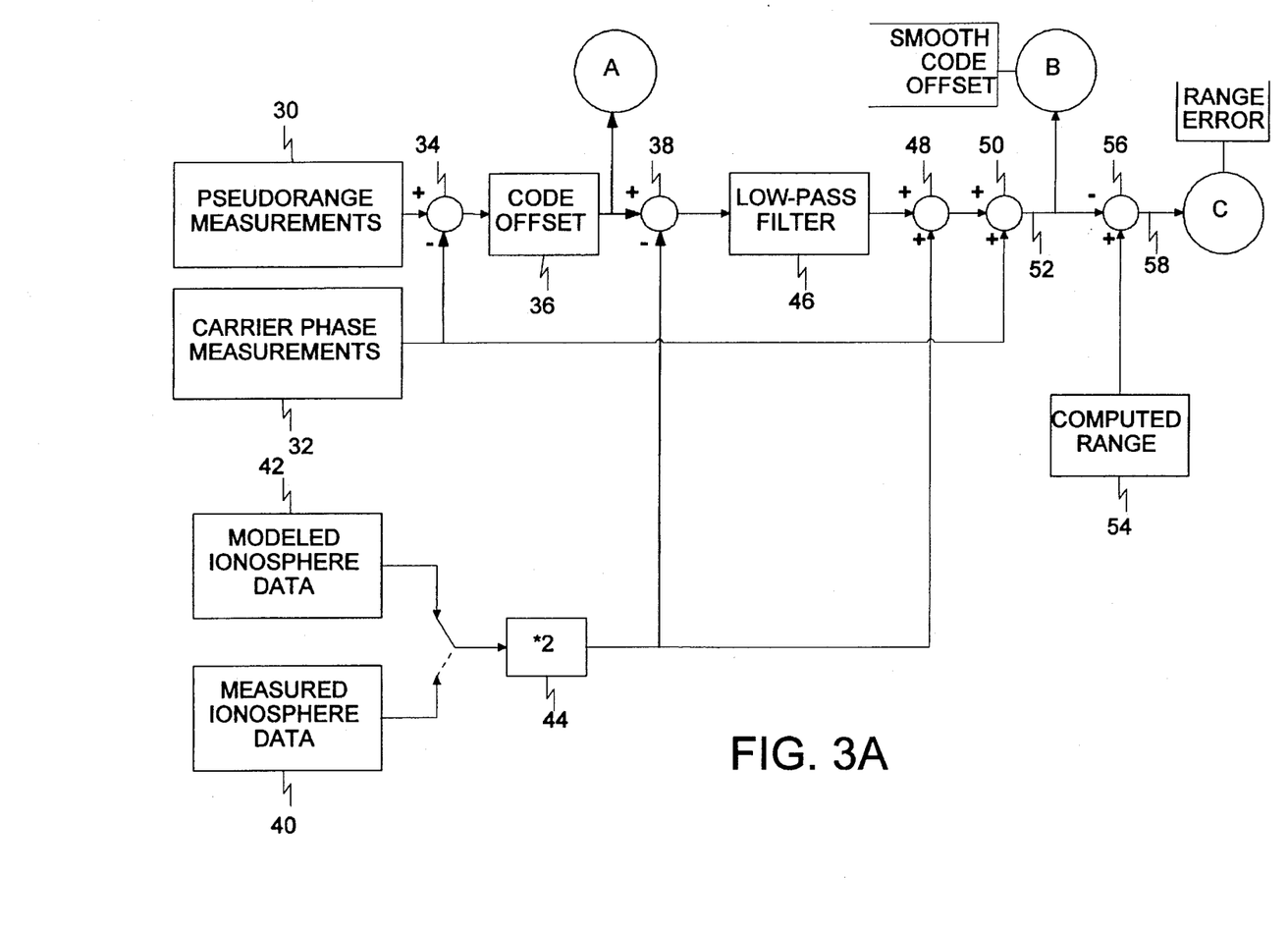
FIG. 3A is a block diagram illustrating operations performed at a reference GPS receiver using the principles of the present invention.
Figure 3B:
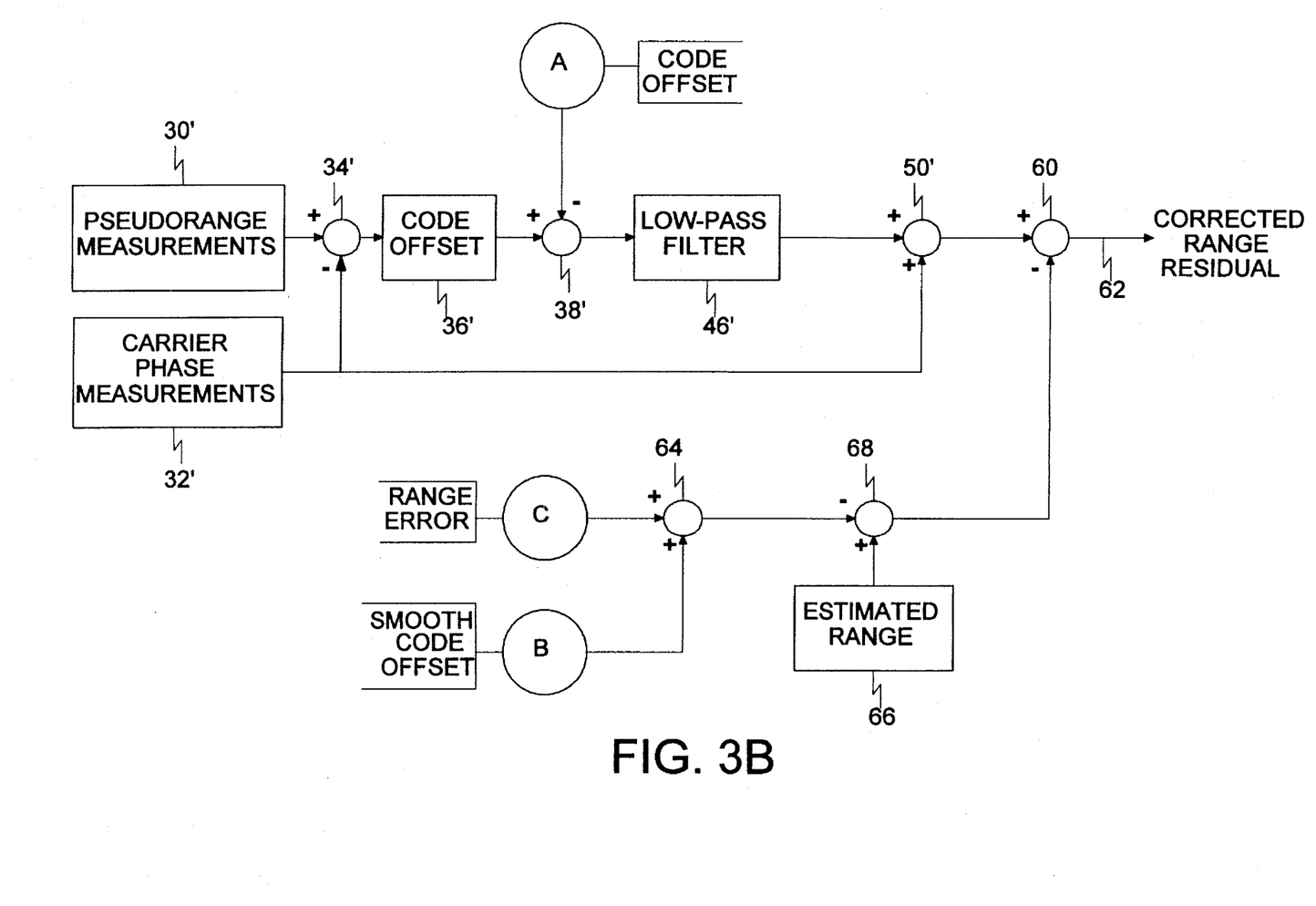
FIG. 3B is a block diagram illustrating operations performed at a remote GPS receiver associated with the reference receiver of FIG. 3A.

FIGS. 3A and 3B show how the basic embodiment of FIG. 1 is applied to differential GPS. As shown in FIG. 3A, the reference receiver includes all of the same components that are shown in the basic embodiment of FIG. 2, and provides a smoothed pseudorange signal on line 52. The reference receiver also derives a computed range value 54 from its accurately known position and the positions of the satellite obtained from received ephemeris data. The receiver subtracts the smoothed pseudorange value on line 52 from the computed range value, in subtractor circuit 56, and outputs on line 58 a range error value.

The basic function of a reference receiver in a differential GPS configuration is to provide correction signals to remote receivers over a communication link other than GPS. In the present invention, the reference receiver transmits three different measurements to the remote receiver: (a) a code offset measurement 36 derived from the output of the subtractor circuit 34, as indicated by connector A, (b) a smoothed code offset measurement, derived from the output of adder circuit 48, as indicated by connector B, and (c) a range error from line 58, as indicated by connector C.

Computation in accordance with the invention at a remote receiver is shown in FIG. 3B. The remote receiver also derives a pseudorange measurement 30' and a carrier phase measurement 32', and subtracts the carrier phase from the pseudorange in subtractor circuit 34', to yield code offset 36'. At this point, instead of subtracting an ionospheric correction, as in the reference receiver, the remote receiver subtracts the code offset input from the reference receiver through connector A, in subtractor circuit 38'. In many cases, the remote receiver will not have ionospheric correction data available and, in any event, the code offset measurement from the reference receiver contains a component that is a near-perfect measure of the ionospheric error. The output of subtractor 38' is smoothed in a low-pass filter 46', and then the carrier phase measurement is added back in adder circuit 50', to yield a smoothed range value.

The smoothed range values are then corrected by subtracting a range error, using a subtractor circuit 60, to obtain a corrected range on output line 62. The error value applied to subtractor circuit 60 is more refined than the range correction received from the reference receiver in conventional systems. First, the remote receiver computes a "range error without code," from the sum of the range correction received from the reference receiver (over connector C) and the smoothed code offset received from the receiver (over connector B). The sum, obtained in adder circuit 64, represents an improved range error value, which is subtracted from an estimated range 66 in subtractor circuit 68. The estimated range 66 is obtained from an estimate of the remote receiver's position, taken together with ephemeris data received from the satellite. This is equivalent to the computed range 54 used in the reference receiver, except that the position of the reference receiver is accurately known, while that of the remote receiver is only estimated at this stage.

The output of subtractor circuit 68 is the range error (with code) to be subtracted from the smoothed range value in adder circuit 60. It will be understood that the corrected range residual values on output line 62 are subsequently used in the receiver to compute the position of the remote receiver, using computational methods well known in GPS technology.

Since removal of ionospheric effects is critical to the present invention, it may be helpful to trace the ionospheric error through FIGS. 3A and 3B. It will be recalled that the ionosphere affects the code measurements of pseudorange in a positive sense (i.e. makes the range values too long), and affects carrier measurements of range in a negative sense (i.e. makes the range values too short). For simplicity, the ionospheric error will be referred to as I, or +I as it affects code measurements and −I as it affects carrier measurements. In the code offset 36, or 36', the ionospheric error is +2I because code offset is derived by subtraction of carrier measurements from phase measurements. As previously discussed, subtractor 38 in the reference receiver subtracts out the entire error +2I, to leave a zero error at the input of the filter 46. Coming out of the filter, the error +2I is added back in, in adder 48. Then, in adder 50, the carrier phase is added in, with its inherent −I error. Therefore, the ionospheric error coming out of adder 50 is 2I−I=I, and the ionospheric error in the range error signal on line 58 to connector C is −I.

In the remote receiver, subtractor 38' subtracts the code offset from the reference receiver from the code offset derived in the remote receiver. Both inputs to the subtractor 38' have an error +2I, so the output has a zero ionospheric error. Then, in adder 50', the carrier phase is added to the filter output, and introduces an error −I. In the calculation of range error in the remote receiver, the adder 64 receives a −I error input from the range error value (through connector C), and a +2I error input from the smoothed code offset input (received through connector B). The output of adder 64 therefore has an error value of −I+2I=I. This error value is negated at subtractor 68 and then subtracted, at subtractor 60, from another −I input from adder 50'. Therefore, the corrected range value on output line 62 from the subtractor has an error value +(−I)−(−I)=0.

The overall effect on ionospheric errors in the processing performed in FIGS. 3A and 3B is that the ionospheric error is reduced to zero before filtering to remove multipath errors, and is reduced to zero for the output of corrected range measurements.

Figure 4A:
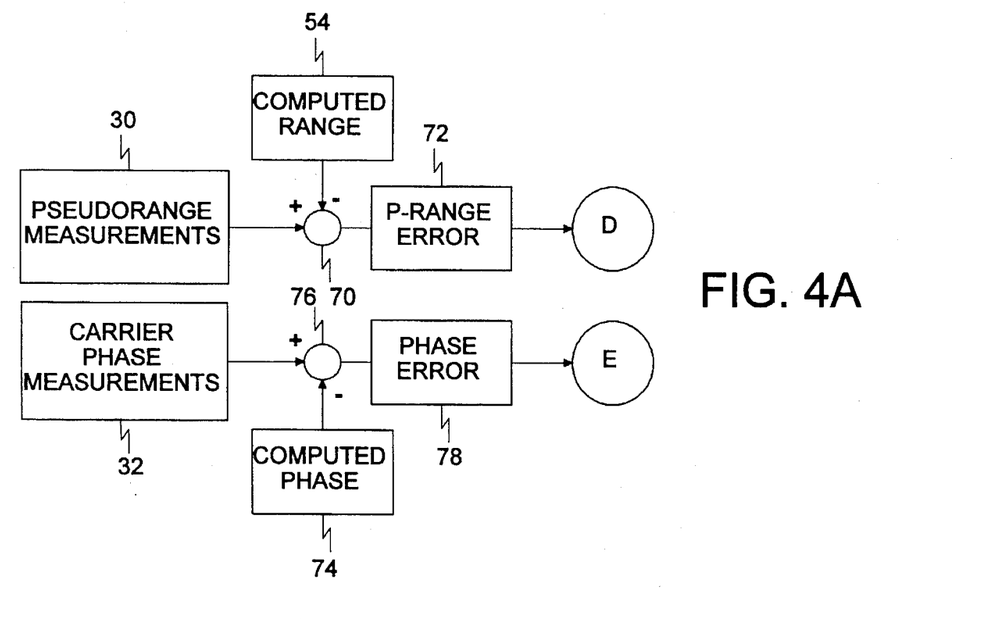
FIGS. 4A and 4B are a block diagrams similar to FIGS. 3A and 3B, illustrating an alternate embodiment of the invention.
Figure 4B:
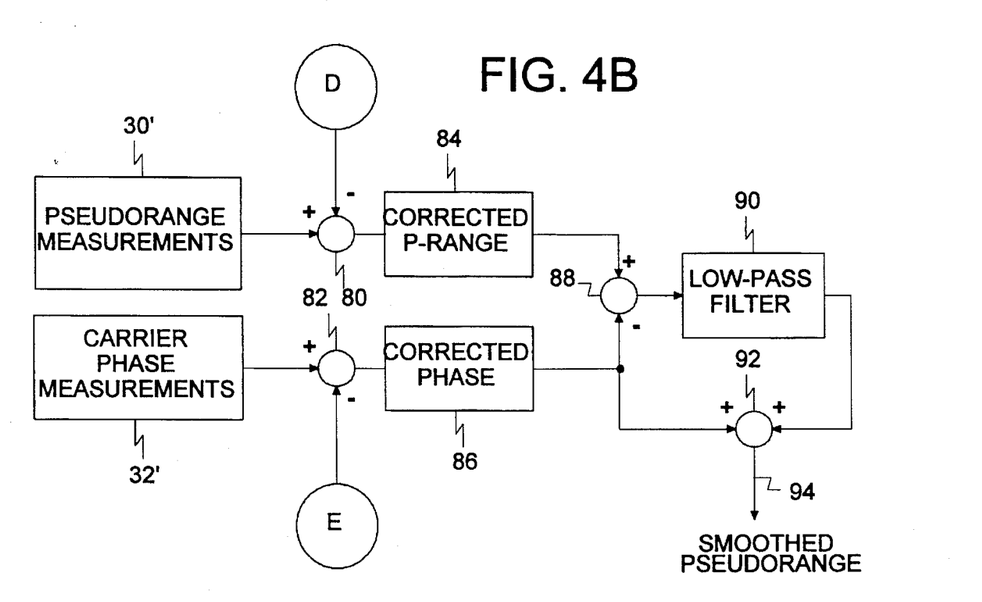

FIGS. 4A and 4B show another embodiment of the invention for use in differential GPS. In the reference receiver, pseudorange (code) measurements 30 and carrier phase measurements 32 are made. Then the computed range 54 is subtracted from the pseudorange 30, in circuit 70, to derive a pseudorange error measurement 72. Similarly, the carrier phase measurement 32 has subtracted from it a computed phase value 74, in subtractor circuit 76, yielding a carrier phase error 78. The two error values 72 and 78 are transmitted to the remote receiver, as indicated by connectors D and E, respectively.

In the remote receiver, separately derived pseudorange and carrier phase measurements 30' and 32' are corrected in subtractor circuits 80 and 82, respectively, using the correction values transmitted from the reference receiver to yield corrected pseudorange and corrected carrier phase values 84 and 86, respectively. The corrected carrier phase is subtracted from the corrected pseudorange, in circuit 88, and the resultant values are filtered in a low-pass filter 90. Then the corrected carrier phase is added back to the filtered result, using adder circuit 92, to obtain smoothed pseudorange values on output line 94. Most of the ionospheric errors are removed as a result of transmitting the pseudorange and carrier phase errors from the reference to the remote receiver and applying these errors as corrections to the pseudorange code measurements and carrier phase measurements in the remote receiver. This is because the transmitted errors contain a component for ionospheric errors as measured at the reference receiver, and these errors are not significantly different at the remote receiver location.

The common feature of the various possible embodiments of the invention in the differential GPS context is that information in both the code pseudorange measurements and the carrier phase measurements, or their corrections, are transmitted from the reference receiver to the remote receiver in some form or other. In the embodiment of FIGS. 4A and 4B, the pseudorange errors and the carrier phase errors are transmitted. In the embodiment of FIGS. 3A and 3B, the reference receiver transmits a range error, a code offset and a smoothed code offset.

It will be appreciated from the foregoing that the present invention represents a significant advance in the field of precision GPS measurements, particularly for navigation applications using differential GPS. In particular, the invention provides a technique for smoothing code measurements with carrier phase measurements, to obtain a more accurate measure of pseudorange, over a much longer time period that previously possible. Moreover, the invention has application for single-frequency receivers, either operating alone or in conjunction with a reference receiver in a differential GPS configuration. It will also be appreciated that, although a few embodiments of the invention have been described in detail for purposes of illustration, various modifications may be made without departing from the spirit and scope of the invention. Accordingly, the invention should not be limited except as by the appended claims.

We claim:

1. For use in a global positioning system (GPS) receiver having a single frequency of operation, a method for smoothing GPS code measurements of pseudorange with carrier phase measurements over an extended time interval without distortion due to divergence between code measurements and carrier measurements, the method comprising the steps of:

obtaining pseudorange code measurements and integrated carrier phase measurements in a single-frequency GPS receiver;

deriving from the pseudorange code measurements and the integrated carrier phase measurements a composite set of measurements that is substantially free of Doppler effects and ionospheric signal delay effects;

filtering the composite set of measurements over an extended time interval to remove errors that affect pseudorange measurements more than integrated carrier phase measurements; and replacing Doppler effects in the filtered composite set of measurements, to obtain smoothed pseudorange code measurements.

2. A method as defined in claim 1, wherein the step of deriving a composite set of measurements includes:

receiving pseudorange code corrections from a reference receiver;

applying the pseudorange code corrections to the pseudorange code measurements, to obtain corrected pseudorange code measurements virtually free of ionospheric errors due to signal delay in the ionosphere;

receiving carrier phase corrections from the reference receiver;

applying the carrier phase corrections to the pseudorange code measurements, to obtain corrected carrier phase measurements virtually free of ionospheric errors due to signal delay in the ionosphere; and subtracting the corrected carrier phase measurements from the corrected pseudorange code measurements, to obtain the composite set of measurements without ionospheric or Doppler effects.

3. A method as defined in claim 1, wherein the step of deriving a composite set of measurements includes:

subtracting the carrier phase measurements from the pseudorange code measurements, to obtain code offset measurements substantially free of Doppler effects; and subtracting ionospheric error values from the code offset measurements, to obtain the composite set of measurements substantially free of signal delay ionospheric effects and Doppler effects.

4. A method for smoothing global positioning system (GPS) code measurements of pseudorange with carrier phase measurements over an extended time interval, the method comprising the steps of:

obtaining pseudorange code measurements and integrated carrier phase measurements in a GPS receiver;

subtracting integrated carrier phase measurements from pseudorange code measurements to remove Doppler effects and obtain code offset measurements;

removing signal delay ionospheric effects from the code offset measurements;

filtering the code offset measurements after removal of the ionospheric effects, over an extended time interval to remove the effect of errors that affect pseudorange measurements more than integrated carrier phase measurements; and adding back to the filtered code offset measurements the integrated carrier phase measurements, to obtain smoothed pseudorange code measurements.

5. A method as defined in claim 4, wherein:

the step of removing signal delay ionospheric effects from the code offset measurements includes applying a correction derived from independent ionospheric measurements.

6. A method as defined in claim 4, wherein:

the step of removing signal delay ionospheric effects from the code offset measurements includes applying a correction derived from ionospheric model data received with GPS signals.

7. A method for differential position determination at a remote global positioning system (GPS) receiver, using a reference GPS receiver of which the position is known, the method comprising the steps of:

in the reference receiver, obtaining pseudorange code measurements and integrated carrier phase measurements, subtracting the carrier phase measurements from the pseudorange code measurements to obtain code offset measurements, removing signal delay ionospheric effects from the code offset measurements, filtering the resulting code offset measurements to obtain smoothed code offset measurements, adding back the carrier phase measurements to obtain smoothed pseudorange code measurements, computing range measurements from the known position of the receiver and known orbital parameters of satellites from which signals are being received, and subtracting the computed range measurements from the smoothed pseudorange code measurements, to obtain range corrections;

transmitting from the reference receiver to the remote receiver the code offset measurements prior to smoothing, and at least one set of measurements pertaining to smoothed range corrections;

in the remote receiver, obtaining pseudorange code measurements and integrated carrier phase measurements, subtracting the carrier phase measurements from the pseudorange code measurements to obtain code offset measurements, removing signal delay ionospheric effects by subtracting the code offset measurements received from the reference receiver, filtering the resulting code offset measurements to obtain smoothed code offset measurements, adding back the carrier phase measurements to obtain smoothed pseudorange code measurements, and then applying range corrections derived in part from the at least one set of measurements pertaining to smoothed range corrections, to derive corrected range measurements.

8. A method as defined in claim 7, wherein:

in the reference receiver, the step of removing signal delay ionospheric effects from the code offset measurements includes applying a correction derived from independent ionospheric measurements.

9. A method as defined in claim 7, wherein:

the step of removing signal delay ionospheric effects from the code offset measurements includes applying a correction derived from ionospheric model data received with GPS signals.

10. A method as defined in claim 7, wherein:

the step of transmitting at least one set of measurements pertaining to smoothed range corrections includes transmitting smoothed code offset measurements and transmitting range corrections; and in the remote receiver, the step of applying range corrections includes subtracting the smoothed code offset measurements received from the reference receiver from the range corrections transmitted from the reference receiver, subtracting the resulting range errors from estimated ranges computed in the remote receiver, and subtracting the result of the latter subtraction from the smoothed code offset measurements generated in the remote receiver, to obtain the corrected range measurements.

11. A method for differential position determination at a remote global positioning system (GPS) receiver, using a reference GPS receiver of which the position is known, the method comprising the steps of:

in the reference receiver, obtaining pseudorange code measurements and integrated carrier phase measurements;

transmitting to the remote receiver at least two sets of measurements selected from the pseudorange code measurements, the integrated carrier phase measurements, corrections to the pseudorange code measurements, corrections to the integrated carrier measurements, and the difference between the pseudorange code measurements and the integrated carrier phase measurements; and in the remote receiver, locally obtaining pseudorange code measurements and integrated carrier phase measurements, then processing the locally obtained measurements using the measurements received from the reference receiver, to derive a set of measurements substantially free of signal delay ionospheric effects and Doppler effects, filtering this derived set of measurements to remove noise effects, and restoring the Doppler effect to provide a smoothed and corrected set of pseudorange code measurements.

12. A method as defined in claim 11, wherein:

in the reference receiver, the method further includes computing theoretical pseudorange values and theoretical carrier phase values using the reference receiver's known position and known information about satellite orbits, and computing corrections for the pseudorange code measurements and the carrier phase measurements;

the step of transmitting to the remote receiver includes transmitting the corrections for the pseudorange code measurements and the carrier phase measurements; and in the remote receiver, the step of processing the locally obtained measurements includes applying the corrections transmitted from the reference receiver, to obtain corrected pseudorange code measurements and corrected carrier phase measurements that are virtually free of signal delay ionospheric effects, then subtracting the corrected carrier phase measurements from the corrected pseudorange code measurements, to obtain the set of measurements for filtering.

13. For use in a global positioning system (GPS) receiver having a single frequency of operation, apparatus for smoothing GPS code measurements of pseudorange with carrier phase measurements over an extended time interval without distortion due to divergence between code measurements and carrier measurements, the apparatus comprising:

means for obtaining pseudorange code measurements and integrated carrier phase measurements in a single-frequency GPS receiver;

means for deriving from the pseudorange code measurements and the integrated carrier phase measurements a composite set of measurements that is substantially free of Doppler effects and signal delay ionospheric effects;

means for filtering the composite set of measurements over an extended time interval to remove errors that affect pseudorange measurements more than integrated carrier phase measurements; and means for replacing Doppler effects in the filtered composite set of measurements, to obtain smoothed pseudorange code measurements.

14. Apparatus as defined in claim 13, wherein the means for deriving a composite set of measurements includes:

means for receiving pseudorange code corrections from a reference receiver;

means for applying the pseudorange code corrections to the pseudorange code measurements, to obtain corrected pseudorange code measurements virtually free of ionospheric errors due to signal delay in the ionosphere;

means for receiving carrier phase corrections from the reference receiver;

means for applying the carrier phase corrections to the pseudorange code measurements, to obtain corrected carrier phase measurements virtually free of ionospheric errors due to signal delay in the ionosphere; and means for subtracting the corrected carrier phase measurements from the corrected pseudorange code measurements, to obtain the composite set of measurements without signal delay ionospheric effects or Doppler effects.

15. Apparatus as defined in claim 13, wherein the means for deriving a composite set of measurements includes:
means for subtracting the carrier phase measurements from the pseudorange code measurements, to obtain code offset measurements substantially free of Doppler effects; and
means for subtracting ionospheric error values from the code offset measurements, to obtain the composite set of measurements substantially free of signal delay ionospheric effects and Doppler effects.

16. Apparatus for smoothing global positioning system (GPS) code measurements of pseudorange with carrier phase measurements over an extended time interval, the apparatus comprising:
means for obtaining pseudorange code measurements and integrated carrier phase measurements in a GPS receiver;
means for subtracting integrated carrier phase measurements from pseudorange code measurements to remove Doppler effects and obtain code offset measurements;
means for removing signal delay ionospheric effects from the code offset measurements;
means for filtering the code offset measurements after removal of the signal delay ionospheric effects, over an extended time interval to remove the effect of errors that affect pseudorange measurements more than integrated carrier phase measurements; and
means for adding back to the filtered code offset measurements the integrated carrier phase measurements, to obtain smoothed pseudorange code measurements.

17. Apparatus as defined in claim 16, wherein:
the means for removing signal delay ionospheric effects from the code offset measurements includes means for applying a correction derived from independent ionospheric measurements.

18. Apparatus as defined in claim 16, wherein:
the means for removing signal delay ionospheric effects from the code offset measurements includes means for applying a correction derived from ionospheric model data received with GPS signals.

19. Apparatus for differential position determination at a remote global positioning system (GPS) receiver, using a reference GPS receiver of which the position is known, the apparatus comprising:
a reference receiver, including means for obtaining pseudorange code measurements and integrated carrier phase measurements, means for subtracting the carrier phase measurements from the pseudorange code measurements to obtain code offset measurements, means for removing signal delay ionospheric effects from the code offset measurements, means for filtering the resulting code offset measurements to obtain smoothed code offset measurements, means for adding back the carrier phase measurements to obtain smoothed pseudorange code measurements, means for computing range measurements from the known position of the receiver and known orbital parameters of satellites from which signals are being received, and means for subtracting the computed range measurements from the smoothed pseudorange code measurements, to obtain range corrections;
means for transmitting from the reference receiver to a remote receiver the code offset measurements prior to smoothing, and at least one set of measurements pertaining to smoothed range corrections;
a remote receiver, including means for obtaining pseudorange code measurements and integrated carrier phase measurements, means for subtracting the carrier phase measurements from the pseudorange code measurements to obtain code offset measurements, means for removing signal delay ionospheric effects by subtracting the code offset measurements received from the reference receiver, means for filtering the resulting code offset measurements to obtain smoothed code offset measurements, means for adding back the carrier phase measurements to obtain smoothed pseudorange code measurements, and means for applying range corrections derived in part from the at least one set of measurements pertaining to smoothed range corrections, to derive corrected range measurements.

20. Apparatus as defined in claim 19, wherein:
in the reference receiver, the means for removing signal delay ionospheric effects from the code offset measurements includes means for applying a correction derived from independent ionospheric measurements.

21. Apparatus as defined in claim 19, wherein:
in the reference receiver, the means for removing signal delay ionospheric effects from the code offset measurements includes applying a correction derived from ionospheric model data received with GPS signals.

22. Apparatus as defined in claim 19, wherein:
the means for transmitting at least one set of measurements pertaining to smoothed range corrections includes means for transmitting smoothed code offset measurements and transmitting range corrections; and
in the remote receiver, the means for applying range corrections includes means for subtracting the smoothed code offset measurements received from the reference receiver from the range corrections transmitted from the reference receiver, means for subtracting the resulting range errors from estimated ranges computed in the remote receiver, and means for subtracting the result of the latter subtraction from the smoothed code offset measurements generated in the remote receiver, to obtain the corrected range measurements.

23. Apparatus for differential position determination at a remote global positioning system (GPS) receiver, using a reference GPS receiver of which the position is known, the apparatus comprising:
a reference receiver, including means for obtaining pseudorange code measurements and integrated carrier phase measurements;
means for transmitting to a remote receiver at least two sets of measurements selected from the pseudorange code measurements, the integrated carrier phase measurements, corrections to the pseudorange code measurements, corrections to the integrated carrier measurements, and the difference between the pseudorange code measurements and the integrated carrier phase measurements; and
a remote receiver, including means for obtaining pseudorange code measurements and integrated carrier phase measurements, means for processing the locally obtained measurements using the measurements received from the reference receiver, to derive a set of measurements substantially free of signal delay ionospheric effects and Doppler effects, means for filtering this derived set of measurements to remove noise effects, and means for restoring the Doppler effect to provide a smoothed and corrected set of pseudorange code measurements.

24. Apparatus as defined in claim 23, wherein:

the reference receiver further includes means for computing theoretical pseudorange values and theoretical carrier phase values using the reference receiver's known position and known information about satellite orbits, and means for computing corrections for the pseudorange code measurements and the carrier phase measurements;

the means for transmitting to the remote receiver includes means for transmitting the corrections for the pseudorange code measurements and the carrier phase measurements; and in the remote receiver, the means for processing the locally obtained measurements includes means for applying the corrections transmitted from the reference receiver, to obtain corrected pseudorange code measurements and corrected carrier phase measurements that are virtually free of signal delay ionospheric effects, and means for subtracting the corrected carrier phase measurements from the corrected pseudorange code measurements, to obtain the set of measurements for filtering.

* * * * *